(12) United States Patent
Hanko et al.

(10) Patent No.: US 8,959,997 B2
(45) Date of Patent: Feb. 24, 2015

(54) METHOD AND APPARATUS FOR MEASURING VOLUME FLOW RATE OF LIQUID FLOWING INTO A CONTAINER AND/OR VOLUME OF LIQUID WHICH HAS FLOWED INTO THE CONTAINER

(75) Inventors: Michael Hanko, Dresden (DE); Stefanie Honncher, Waldheim (DE)

(73) Assignee: Endress + Hauser Conducta Gesellschaft für Mess- und Regeltechnik mbH + Co. KG, Gerlingen (DE)

( * ) Notice: Subject to any disclaimer, the term of this patent is extended or adjusted under 35 U.S.C. 154(b) by 168 days.

(21) Appl. No.: 13/807,768

(22) PCT Filed: Jun. 20, 2011

(86) PCT No.: PCT/EP2011/060208
§ 371 (c)(1),
(2), (4) Date: Dec. 31, 2012

(87) PCT Pub. No.: WO2012/000816
PCT Pub. Date: Jan. 5, 2012

(65) Prior Publication Data
US 2013/0104668 A1    May 2, 2013

(30) Foreign Application Priority Data

Jul. 1, 2010 (DE) .......................... 10 2010 030 790
Feb. 3, 2011 (DE) .......................... 10 2011 003 615

(51) Int. Cl.
*G01F 23/00* (2006.01)
*G01F 1/34* (2006.01)
(Continued)

(52) U.S. Cl.
CPC .. *G01F 1/34* (2013.01); *G01F 3/38* (2013.01); *G01F 13/00* (2013.01); *G01F 22/02* (2013.01)
USPC ....................................................... 73/290 R

(58) Field of Classification Search
USPC .............................. 73/861, 23.2, 1.35, 290 R
See application file for complete search history.

(56) References Cited

U.S. PATENT DOCUMENTS 4,840,064 A * 6/1989 Fudim .......................... 73/290 B
4,922,975 A   5/1990 Polaschegg
(Continued)

FOREIGN PATENT DOCUMENTS

DE    36 02 075 C1   7/1987
DE    196 54 829 A1  6/1998
(Continued)

OTHER PUBLICATIONS

Database WPI Week 200045, Thomas Scientific, London, GB; AN 2000-504619, XP002660795.
(Continued)

*Primary Examiner* — Jewel V Thompson
(74) *Attorney, Agent, or Firm* — Bacon & Thomas, PLLC

(57) ABSTRACT

A method and apparatus for measuring volume flow rate of a liquid flowing into a container and/or volume of the liquid flowed into the container, with which method, respectively with which apparatus a high measure of automation is achievable in microfluidic systems, especially in the field of analysis. Before liquid flows in, gas is enclosed under a starting pressure in a predetermined starting volume in the container, then liquid is allowed to flow into the container to compress the enclosed gas to a gas volume dependent on the volume of the flowed-in liquid, and to effect a rise of gas pressure of the gas in the container relative to the starting pressure dependent on the volume of liquid which has flowed in and on the volume flow rate of the inflowing liquid, the gas pressure in the container is measured as a function of time, and the volume flowed in up to a given time and/or the volume flow rate of inflowing liquid at the given time are/is determined based on the measured gas pressure.

22 Claims, 3 Drawing Sheets

(51) Int. Cl.
*G01F 3/38* (2006.01)
*G01F 13/00* (2006.01)
*G01F 22/02* (2006.01)

(56) References Cited

U.S. PATENT DOCUMENTS

| | | | |
|---|---|---|---|
| 7,461,549 | B1 | 12/2008 | Ding et al. |
| 7,716,993 | B2 * | 5/2010 | Ozawa et al. .................. 73/861 |
| 7,809,473 | B2 * | 10/2010 | Shajii et al. .................. 700/282 |
| 2005/0171475 | A1 | 8/2005 | Delnevo |

FOREIGN PATENT DOCUMENTS

| | | |
|---|---|---|
| DE | 10 2005 023 410 A1 | 11/2006 |
| DE | 2 236 201 A1 | 10/2009 |

OTHER PUBLICATIONS

German Search Report in 10 2010 030 790.4, dated Feb. 1, 2011.
International Search Report in PCT/EP2011/060208, dated Oct. 28, 2011.
German Search Report in 10 2011 003 615.6, dated Jan. 16, 2012.
International Search Report in PCT/EP2011/060208, dated Jan. 8, 2013, English translation thereof.

* cited by examiner

METHOD AND APPARATUS FOR MEASURING VOLUME FLOW RATE OF LIQUID FLOWING INTO A CONTAINER AND/OR VOLUME OF LIQUID WHICH HAS FLOWED INTO THE CONTAINER

TECHNICAL FIELD

The invention relates to a method for measuring volume flow rate of liquid flowing into a container and/or volume of liquid which has flowed into the container, as well as to an apparatus for performing such method.

BACKGROUND DISCUSSION

The invention is applicable in all areas of industrial measurements technology, as well as medicine and laboratory technology, in which liquids are transported, dosed or metered in controlled form, especially with the assistance of microfluidic systems or in the field of micro-methods technology. This is especially the case in the field of analysis of liquids. Examples of this include analytical systems for monitoring and optimizing the cleaning effectiveness of clarification plants, for drinking water monitoring, for monitoring biotechnological processes or for quality monitoring of industrially applied liquids or food. Measured and monitored are, for example, the content in liquid samples of substances, such as e.g. ions, for instance ammonium, phosphate or nitrate, biological or biochemical compounds, such as e.g. hormones, or microorganisms, e.g. bacteria.

In such systems, besides the liquid to be analyzed, also, in given cases, additional liquids required for their analysis, such as e.g. reagent solutions, must be dosed, or metered, in predetermined amounts, and, in given cases, certain desired volumes of different liquids must be mixed, and/or certain desired volume flow rates of liquids through lines or measuring- and/or analytical units must be produced.

In order, especially in the field of analysis, to be able to achieve an as high as possible measure of automation, apparatuses and methods are required, by which the, in miniaturized systems required, as a rule, very small desired volumes of less than 50 mL, especially less than 10 mL can be dosed, and by which small volume flow rates of less than 5000 µL/min, especially less than 1000 µL/min, of the liquids through the individual systems can be controlled as a function of the predetermined volume flow rates desired, in each case, for the process or method to be performed.

For the transport of these liquids, today, for example, peristaltic pumps are applied. Peristaltic pumps bring about, however, due to their functional principle, as a rule, pulsating volume flow rates. Additionally, the elastic hoses used in connection with peristaltic pumps are subject to aging, which affects the transport power of peristaltic pumps. In these ways, the accuracy, with which certain desired volumes of a liquid can be filled, or desired predetermined volume flow rates can be provided, is limited.

Another frequently applied variant for the transport of the liquids is syringe pumps. These are distinguished by high accuracy and uniform flow characteristics. However, standing against the application of syringe pumps in automated systems is their high price and their low robustness.

Volume flow rates can be achieved simply by pneumatic apparatuses, in the case of which liquid flows as a result of pressure loading of the liquid in a supply container with a gas, especially with air. Typically, however, the flow resistance of these systems changes with time, due, for instance, to the increasing emptying of the supply container, so that, in this case, a control of the volume flow through the system is required.

For this, the volume flow rate can be measured e.g. by corresponding flow sensors integrated in the liquid system. Such flow sensors are described, for example, in WO 2007/147786 A1. These sensors are, however, expensive and come in direct contact with the liquid. The latter feature introduces the danger of fouling both of the sensor as well as also the liquid.

SUMMARY OF THE INVENTION

It is an object of the invention to provide apparatus and/or method for measuring volume flow rate of liquid flowing into a container and/or volume of liquid which has, flowed into the container. The apparatus and/or method should enable, especially in microfluidic systems and especially in the field of analysis, achievement of a high measure of automation.

To this end, the invention resides in a method for measuring volume flow rate of liquid flowing into a container and/or volume of liquid which has flowed into the container, which method comprises steps as follows:

enclosing a gas under a starting pressure in a predetermined starting volume in the container before liquid flows in, then allowing liquid to flow into the container to compress the enclosed gas to a gas volume dependent on the volume of liquid which has flowed into the container and to effect a rise of the gas pressure of the gas in the container relative to the starting pressure dependent on the volume of liquid which has flowed in and on the volume flow rate of the inflowing liquid, measuring gas pressure in the container as a function of time, and determining, based on measured gas pressure, the volume of liquid which has flowed in up to a given time and/or the volume flow rate of inflowing liquid at the given time.

In such case, the volume of liquid which has flowed in up to the given time is determined based on the gas pressure measured at the given time.

The volume flow rate is determined by measuring a time rate of change of gas pressure, and determining the volume flow rate of liquid flowing at the given time into the container based on the time rate of change of gas pressure measured at the given time.

In a further development, a relative gas pressure is defined, which equals a quotient of the starting pressure and the gas pressure, a characteristic variable is determined, which gives the slope of the relative gas pressure as a function of the volume of liquid which has flowed in, during the flowing of liquid into the container, the relative gas pressure is determined as a function of time based on the gas pressure measured as a function of time, and volume and/or volume flow rate are determined based on the relative gas pressure.

In such case, the characteristic variable is preferably determined in a previous calibration method.

In an embodiment of this further development the volume which has flowed in up to the point in time is determined as a quotient of the relative gas pressure at the given time reduced by 1 and the characteristic variable, and/or a time rate of change of the relative gas pressure is determined, and the volume flow rate of liquid flowing at the given time is determined as a quotient of the time rate of change of the relative gas pressure and the characteristic variable.

Additionally, the invention resides in an apparatus for performing the method of the invention, comprising an apparatus connected to the container and serving to enclose gas under a starting pressure in a predetermined starting volume in the interior of the container before liquid flows in, a pressure sensor for measuring gas pressure in the container, a liquid supply system connected to a filling opening of the container opening into the interior of the container and serving to supply liquid to the container, and an electronic unit, which, based on the gas pressure measured with the pressure sensor after the closing of the container filled with gas under the starting pressure with the starting volume, determines volume of liquid which has flowed in and/or volume flow rate of the inflowing liquid.

In an embodiment of the apparatus, the container can include a piston movable in the interior of the container and liquid- and gas tightly contacting a container wall enclosing the interior for dividing the container into a liquid space, into which the filling opening opens, and a gas space, which is in communication with the apparatus serving to enclose gas in a predetermined starting volume in the interior of the container under a starting pressure before liquid flows in, as well as being in communication with the pressure sensor.

In a further development, the apparatus includes a control unit, which controls the liquid supply effected by the liquid supply system as a function of the flowed-in volume measured in the container or the measured volume flow rate inflowing into the container.

In an embodiment, the control unit ends the liquid supply, when the measured volume reaches a certain desired volume.

In an embodiment, the liquid supply system includes at least one storage unit filled with liquid, especially two storage units filled with liquid, and an apparatus for effecting liquid flow from the storage unit, especially the storage units, into the container, wherein the at least one storage unit has a chamber, in which liquid is accommodated, and in which is arranged a movable piston liquid- and gas tightly contacting an inner wall enclosing the chamber. The piston divides the at least one storage unit into a liquid space connected with the container via at least one liquid line and a gas space connected with the apparatus for effecting liquid flow from the storage unit, especially the storage units, into the container.

Additionally, the invention resides in a method for operating the control unit equipped apparatus, whose liquid supply system includes at least two storage units filled with liquid and an apparatus for effecting liquid flow from the storage units into the container, which method comprises steps as follows:

enclosing the gas in the predetermined starting volume under the starting pressure, filling the container via the apparatus for effecting the liquid flow successively with certain desired volumes of liquids from two or more different storage units, wherein the reaching of the respective desired volumes of the individual liquids is monitored based on the measured total volume, which has flowed into the container, and the volume already located in the container at the beginning of the respective filling procedure with the respective liquid from the respective storage unit and measured with the apparatus.

In the successive filling of the container with the different desired volumes of the individual liquids, preferably, the filling starts with the liquid, of which the greatest desired volume is required, and the filling then successively continues, in each case, with the liquid, of which the next smaller desired volume is required.

Additionally, the invention resides in a further development of the apparatus of the invention, wherein the liquid supply system transports the liquid through a feed line into the container, volume flow rate of the liquid through the feed line equals volume flow rate of liquid flowing into the container, and a control system is provided, which controls the liquid supply effected by the liquid supply system based on the measured volume flow rate into the container in such a manner that the volume flow rate through the feed line and the volume flow rate into the container correspond to a certain desired volume flow rate.

This control is especially advantageous for the above described embodiments, in the case of which the at least one storage unit, or the storage units, and/or the container, in each case, include a movable piston, which divides the container, or storage units, in each case, into a gas space and a liquid space. The force on the piston required for transporting the liquids from the storage units into the containers is effected, for example, by pressure loading of the gas spaces of the storage units. Such force depends also on the respective frictional resistance that the piston meets in the storage units, or in the container. Since the liquid supply is controlled based on the registered volume flow rate, different frictional resistances of the pistons are cared for by the control.

In a preferred embodiment a measuring- or analytical system is inserted into the feed line, volume flow rate of the liquid through the measuring- or analytical system equals volume flow rate through the feed line and equals volume flow rate of liquid flowing into the container, and the control system controls volume flow rate through the measuring- or analytical system to a certain desired volume flow rate based on the measured volume flow rate into the container.

Additionally, the invention resides in a further development of the apparatus of the invention, wherein the liquid supply system includes at least one storage unit filled with liquid and an apparatus for effecting liquid flow from at least one of the storage units into the container, and the apparatus for effecting the liquid flow includes a controllable pneumatic pressure source, which is connected to each storage unit via a pressure supply line equipped with a controllable valve, especially a 3/2 valve, and liquid flow is effected by pressure loading of liquid in the storage units with pressure provided by the controllable pneumatic pressure source.

In a first further development of the latter further development, the controllable pneumatic pressure source is connected to the container via a pressure supply line closable with a controllable valve, especially a 3/2 valve.

In a preferred further development, the liquid supply system is connected to the container via at least one supply line equipped with a valve, especially a check valve.

Additionally, the invention resides in a method for operating an apparatus according to the three latter further developments, in the case of which method operating cycles are executed, in which, in each case, the container and the liquid in the storage units are earlier supplied with the starting pressure via the 3/2 valves, the valve in the pressure supply line leading from the pressure source to the container is closed, liquid flow into the container is effected by pressure loading liquid in at least one of the storage units with a pressure provided by the pressure source, and, terminally, total liquid that flowed into the container in the respective operating cycle is removed from the container, especially by pressure loading.

In an additional, further development of the first further development of the apparatus, the container is connected via a drain line equipped with a valve, especially a check valve, to a receiving vessel, which is loaded via an air escape opening with ambient pressure and into which liquid located in the container can be removed.

Additionally, the invention resides in a method for operating an apparatus according to the latter further development, wherein liquid is removed from the container at the end of a fill cycle, by interrupting liquid supply into the container, and loading liquid contained in the container with a pressure via the pressure source, whereupon the liquid flows through the check valve and out via the drain line.

Additionally, the invention resides in a method for operating apparatuses of the invention, in the case of which operating cycles are executed, which method comprises, in each cycle, steps as follows:

enclosing gas in the predetermined starting volume under the starting pressure, effecting liquid flow into the container and measuring volume flow rate of liquid inflow and/or volume flowed in, interrupting liquid supply into the container, before gas pressure in the container exceeds a predetermined maximum pressure, and, terminally, removing from the container total liquid, which flowed into the container in the respective fill cycle.

The invention has the advantage that the apparatus can be operated fully automatically. A further advantage is that the measurements occur indirectly based on gas pressure in the container, so that no direct contacting of the liquid, especially no direct contact by sensors, is required. Moreover, the invention offers the advantage that the measuring, due to the indirect measuring method of the invention, is largely independent of the type of liquids present, especially their viscosities, their inhomogeneities and, in given cases, therein contained contaminants. This is especially an advantage compared with the calorimetric flow measuring method, in the case of which the accuracy of measurement depends decisively on the, in given cases, variable heat capacities of the liquids.

The apparatuses of the invention offer the advantage that they are extremely versatilely applicable. They permit replacement of dosing syringes, syringe pumps, peristaltic pumps as well as also systems, which produce volume flows in pneumatic ways and control these to certain desired volume flows based on direct flow measurements with flow sensors installed in the flow path.

BRIEF DESCRIPTION OF THE DRAWINGS

The invention and other advantages will now be explained in greater detail based on the appended drawing, in which two examples of embodiments are presented. Equal elements are provided in the figures with equal reference characters. The figures of the drawing show as follows.

DETAILED DISCUSSION IN CONJUNCTION WITH THE DRAWINGS

Figure 1:
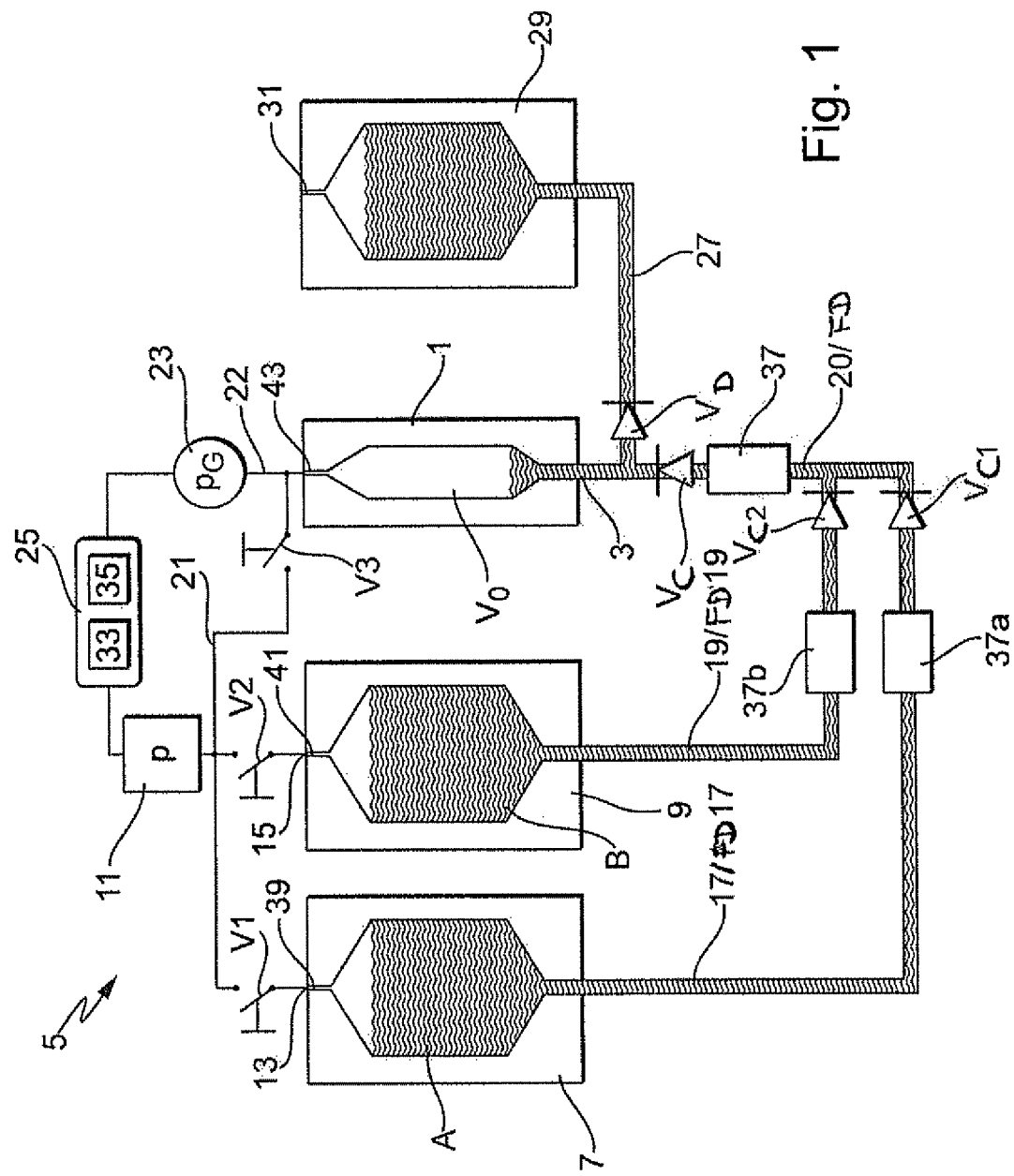
FIG. 1 is an apparatus of the invention.

FIG. 1 shows an apparatus of the invention for measuring volume flow rate $dV(t)/dt$ of a liquid flowing into a container 1 and/or volume $V(t)$ of the liquid, which has flowed into the container 1.

The apparatus includes a liquid supply system 5 connected to a filling opening 3 of the container 1 opening into the interior of the container 1. Liquid supply system 5 serves to supply liquid to the container 1. Supply system 5 includes at least one storage unit 7, 9 full of liquid A, B ready to be used. The storage units 7, 9 are, for example, supply containers, which contain individual liquids to be analyzed or they contain supplemental liquids required for analysis, such as e.g. reagent solutions. Liquids A, B can be contained in the storage units 7, 9, for example, in flexible, gas- and liquid impermeable containments, e.g. a bag of a plastic foil, or film, for example, of polyethylene or polypropylene. Storage units 7, 9 are preferably embodied as exchangeable modules. In such case, storage units 7, 9 can be provided as individual elements, or two or more storage units can be combined connected in parallel to one another in a supply cartridge, preferably a replaceable, supply cartridge.

The storage units 7, 9 are connected to an apparatus for effecting liquid flow from at least one of the storage units 7, 9 into the container 1. This apparatus includes a controllable pneumatic pressure source 11, which is connected via respective pressure supply lines 13, 15 to the input sides of the storage units 7, 9. Controllable valves V1, V2 respectively control the opening and closing of the pressure supply lines 13, 15. Valves V1, V2 are preferably 3/2 valves, via which the storage units 7, 9 are selectively loadable on their input sides with the pressure p from the pressure source 11 or with a reference pressure $p_R$, preferably atmospheric pressure, or their input sides can be pressure- and gas tightly isolated by complete closing of the respective valves V1, V2. The terms 'open' and 'close' are meant here, with reference to all valves, to signify that the particular line, in which the valve sits, lets fluid pass in the case of opened valve and blocks the passage of fluid in the case of closed valve.

The output sides of the storage units 7, 9 are connected respectively via supply lines 17, 19 to the filling opening 3 of the container 1. The ends of supply lines 17, 19 facing container 1 contain valves VC1, VC2, which are preferably check valves. The two supply lines 17, 19 feed in the illustrated example of an embodiment into a supply line 20, which connects them with the filling opening 3.

If only one storage unit, e.g. storage unit 7, is provided, then preferably a single supply line 20 leads directly to the filling opening 3 from the storage unit 7 and such is controlled by valve VC supplementally drawn in FIG. 1. In that case, the second storage unit 9, its supply line 19 and the two valves VC1 and VC2 are omitted.

The same is true for a larger number of storage units applied always at the same time in parallel for filling. Their liquids are led together into a supply line 20 leading directly to the container 1. This corresponds to the illustrated variant without the two valves VC1 and VC2 in the supply lines 17 and 19.

If, in contrast, two or more storage units 7, 9 are connected respectively via their supply lines 17, 19 equipped with the respective valves VC1, VC2, e.g. via the main supply line 20, to the container 1, then valve VC supplementally shown here can be omitted.

Figure 2:
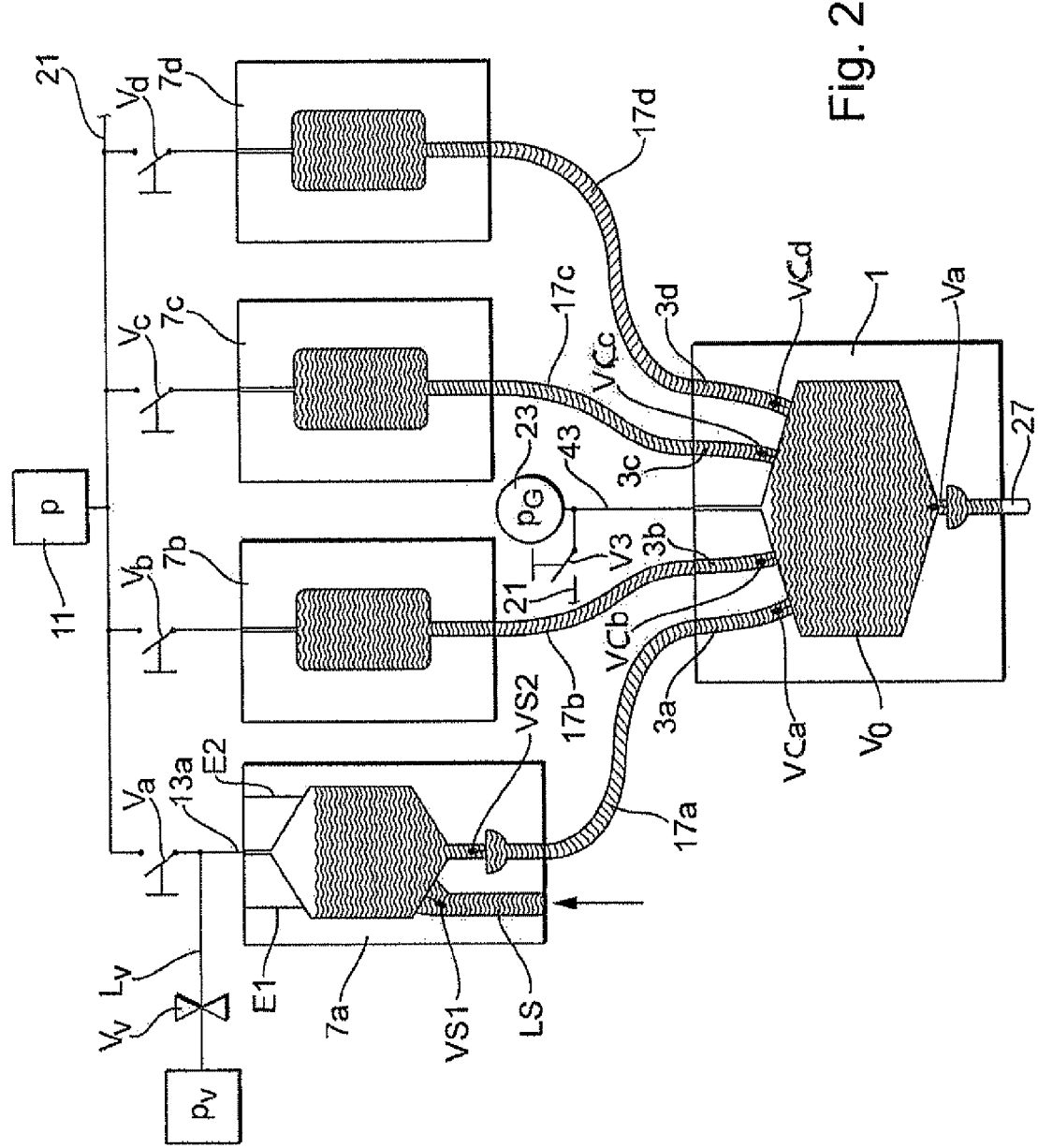
FIG. 2 is a section of an alternative embodiment.

Alternatively, the container 1 can have a separate filling opening for each of the supply lines coming from a different storage unit, and each of these supply lines has its own valve. This form of embodiment is illustrated in FIG. 2 as an alternative embodiment of an apparatus of the invention. In FIG. 2, there are four storage units 7a, 7b, 7c, 7d connected, in each case, via one of the thereto connected supply lines 17a, 17b, 17c, 17d, to one of the four filling openings 3a, 3b, 3c, 3d of the container 1. Each of the four supply lines 17a, 17b, 17c, 17d is equipped container-side with a valve VCa, VCb, VCc, VCd, preferably each being a passive check valve.

Liquid flow from one or, in time sequence, one after the other, from a plurality of storage units 7, 9 into the container 1 can, in the case of the variant illustrated in FIG. 1, be effected at any time by loading of the liquid in the respective storage unit 7, 9 via the pressure source 11 with a pressure p, which lies far enough above the pressure reigning in the interior of the container 1, in order to overcome the cracking pressure of the respective check valve VC1, VC2, or VC and the flow resistance of the respective supply line 17, 19 and 20. As soon as the pressure falling across the particular check valve VC1, VC2, or VC is greater than its cracking pressure, liquid flows from the respective storage unit 7, or 9 into the container 1. The flow increases with increasing pressure p provided by the pressure source 11. Via a corresponding operating of the pressure source 11 and the valves V1, V2, the liquid supply can occur fully automatically. In such case, as a function of the measuring method of the invention and the application of the apparatus, container 1 is, at predetermined times, fed liquid A, B from a selected storage unit, from a plurality of selected storage units, or from all storage units 7, 9, or the liquid supply is totally interrupted.

In order to interrupt the liquid supply from one or more storage units 7, 9, liquid A, B in the affected storage unit or units 7, 9 is supplied with the reference pressure $p_R$, especially atmospheric pressure, preferably via a corresponding operating of the respective 3/2 valves V1, V2 in the associated pressure supply lines 13, 15. In this way, it is achieved that the pressure drop across the respective check valve VC1, VC2, or VC sinks immediately below the cracking pressure, and no more liquid A, B can move through the respective supply line 17, 19, or 20. Alternatively, in the case of application of active valves instead of passive check valves VC1, VC2, the liquid supply can also be controlled by active opening and closing of these valves. In such case, it is necessary, however, that a sufficient positive pressure must be present in the storage units 7, 9 compared with the volume of container 1, in order, in the case of opened active valve, to produce a sufficient volume flow rate of the liquid.

Liquid supply from the individual storage units 7a, 7b, 7c, 7d of the variant illustrated in FIG. 2 is effected in equal manner, using the pressure supply lines 13a, 13b, 13c, 13d, each equipped with a 3/2 valve Va, Vb, Vc, Vd and connected to the pressure source 11.

In contrast to the variant illustrated in FIG. 1, in the case of which all storage units 7, 9 are supply containers earlier filled with liquid, in FIG. 2, by way of example, one storage unit, storage unit 7a, is embodied as a sample reservoir, which can be filled within the apparatus of the invention in a previous filling procedure with a liquid S, e.g. a sample to be analyzed. For this, storage unit 7a has a sample supply line LS opening into its interior and equipped with a valve VS1, preferably a check valve, and the interior is connected via a branch line $L_V$ to a vacuum pump $P_V$. Branch line $L_V$ connects into the pressure supply line 13a between storage unit 7a and valve Va and is equipped with a valve $V_V$. By applying a vacuum to the interior, liquid S can be drawn via the sample supply line LS into the storage unit 7a. During this, the fill level in the interior is monitored, preferably through a corresponding sensor—here illustrated by the two electrodes E1, E2. In order, during the filling procedure, to block liquid movement via the supply line 17a leading to container 1, an additional valve VS2, preferably likewise a check valve, is provided in the output of the storage unit 7a connected with the supply line 17a.

Figure 3:
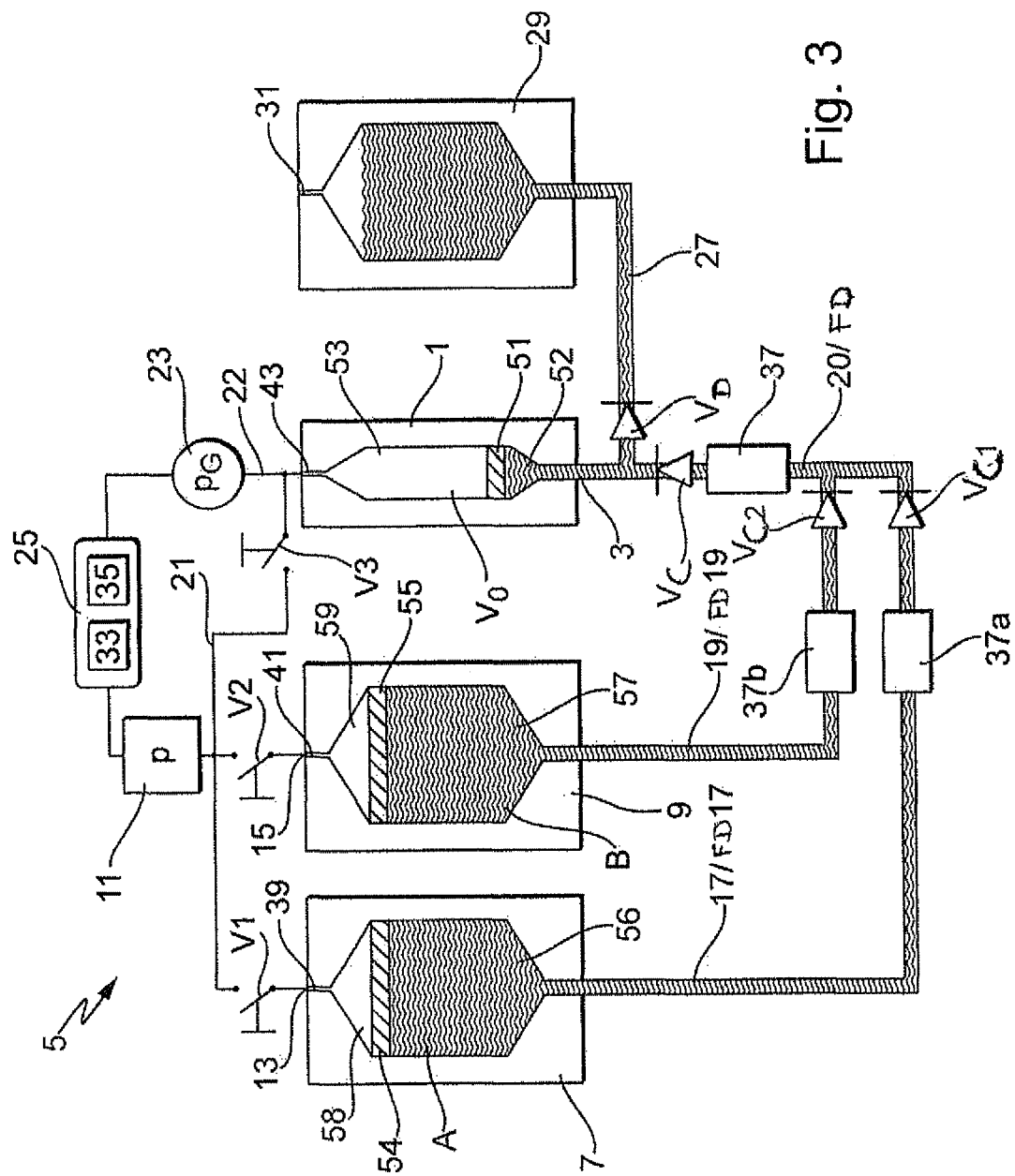
FIG. 3 is a variant of the apparatus of FIG. 1.

FIG. 3 shows an alternative embodiment of the example of an embodiment in FIG. 1. The embodiment of FIG. 3 differs from the apparatus shown in FIG. 1, by, among other things, the fact that container 1 has a piston 51, which is movable within container 1 and which divides container 1 into a liquid space 52, into which the filling opening 3 opens, and a gas space 53, which communicates via the pneumatic connection 43 with the pneumatic pressure source 11. Piston 51 contacts the, for example, cylindrical, inner wall of container 1 liquid- and gas tightly. For example, the container 1 can be embodied in this embodiment in the form of a conventional syringe, preferably a single use syringe, of synthetic material, for example plastic, with an, especially cylindrical, syringe body and a piston 51 movable therein and liquid- and gas tightly contacting the inner wall of the syringe body, and a syringe nozzle lying opposite the piston, for example, a conical syringe nozzle, serving as filling opening 3. The liquid space 52 enclosed between piston 51 and the syringe nozzle serves for accommodating liquid led via the filling opening 3 into container 1. The gas space 53 formed on the side of the piston facing away from the liquid space 52 is connected via a pneumatic connection 43 with the pressure sensor, or gage, 23 and, in the case of open valve V3, with the pneumatic pressure source 11.

Also, the storage units 7 and 9 have in the embodiment according to FIG. 3 chambers for liquid reception, in which movable pistons 54, 55 are arranged making liquid sealing contact with the inner walls of the chambers. The pistons 54, 55 divide the storage units 7, 9, in each case, into a liquid space 56, 57 filled with liquid A, B and a gas filled, gas space 58, 59 loadable with pressure via the pressure source 11 and the valves V1, V2. As in the case of container 1, the liquid containers 7 and 9 can, in this embodiment, in each case, be in the form of a conventional syringe of glass or synthetic material, with an, especially cylindrical, syringe body and a piston movable therein and liquid- and gas tightly contacting the inner wall of the syringe body, and a syringe nozzle lying opposite the piston, for example, a conical syringe nozzle, wherein the syringe nozzle is connected, in each case, with the respective supply line 17, or 19. By pressure loading of the gas spaces 58, 59 by means of the pneumatic pressure source 11, the piston can be moved forward, to the extent that the applied pressure is selected large enough to overcome the frictional force of the piston 54, or 55 and, in given cases, 51, on the respective container inner wall, the line resistances of the supply lines 17, 19, 20 and the cracking pressure of the valves VC1, VC2 and VC3, and so transport liquid A, B into the supply lines 17, 19 and, in this way, toward container 1.

Advantages of this embodiment of container 1 and, in given cases, storage units 7 and 9 with movable pistons include preventing contaminants, for example, microorganisms, from moving from the liquid- to the gas phase, or vice versa. Along with that, it is also prevented that the gas applied for pressure loading dissolves in the liquid. Equally, in this way, it is effectively prevented that the liquid leaks or evaporates from the storage units and/or the container. Additionally, the application of single use syringes is very easy to implement. Also, the installed position does not have to be defined in the case of the application of syringes as storage units and/or container.

Apart from the special feature of sample taking, the following explanations hold for the example of an embodiment illustrated in FIG. 1, and its variation according to FIG. 3, as well as correspondingly also for the example of an embodiment presented in FIG. 2.

Container 1 has in its interior a predetermined starting volume $V_0$, which, at the beginning of each operating cycle of the apparatus, contains no liquid. Drops or residual moisture, in given cases, still clinging on the inner walls are, due to the extremely small influence on the method of the invention, considered to be negligible. Connected to container 1 is an apparatus, which serves to enclose in the predetermined starting volume $V_0$, before the inflow of liquid, gas, especially air, under a starting pressure $p_0$. In the embodiment according to FIG. 3, the starting volume $V_0$ is the volume of the gas space 53 in a starting state of container 1, in which the piston 51 is preferably located in a start position in the vicinity of the filling opening 3 of container 1.

Preferably, the, in any event, present, controllable, pneumatic pressure source 11 is connected to container 1 via a further pressure supply line 21 equipped with a valve V3, preferably a 3/2 valve. The starting pressure $p_0$ can be a pressure p provided by the pressure source 11, with which container 1 is loaded via the pressure supply line 21, Preferably, however, the starting pressure $p_0$ is the above mentioned, reference pressure $p_R$, i.e. preferably atmospheric pressure, with which container 1 is loaded by a corresponding operating of the 3/2 valve V3. The gas located in this way in container 1 in the starting volume $V_0$ is then enclosed by sealing container 1 gas- and pressure-tightly by the complete closing of valve V3. Thereafter, there reigns in the interior of the now closed system the starting pressure $p_0$.

Alternatively, the starting volume $V_0$ could be filled with air under atmospheric pressure via a ventilation opening (not shown) in container 1, and then sealed gas tightly by means of a suitable closure.

In order to be able to specify the starting volume $V_0$ in a reproducible manner, preferably earlier, a defined starting state of the apparatus is effected, in the case of which the supply lines 17, 19, respectively 20 are filled with liquid A, B up to the respective therein located valves VC1, VC2, or VC. The reproducible predeterminable starting volume $V_0$ includes then the non liquid filled, remaining line volumes of the supply lines 17, 19, 20 between the respective valve VC1, VC2, or VC and the container opening 3, the internal volume of container 1 and the line volume of the interior of the pressure supply line 21 from container 1 up to valve V3. In the example of an embodiment shown in FIG. 3, piston 51 is brought into the start position in the vicinity of the filling opening 3. For setting this start position, a stop for the piston 51 can be formed on the container inner wall.

Connected to container 1 is a pressure sensor 23, with which a gas pressure $p_G$ in the interior of container 1 is measured. To the extent that the pressure sensor 23 is not arranged directly in the interior of container 1, then also the internal volume of the connection line 22, via which the gas pressure $p_G$ is fed to the pressure sensor 23, forms a component of the starting volume $V_0$.

In a first method step, as already explained above, the gas is enclosed in the starting volume $V_0$ under the starting pressure $p_0$. Preferably, the liquids in the storage units 7, 9 are likewise supplied via the 3/2 valves V1, V2 installed in their pressure supply lines 13, 15 with gas under the starting pressure $p_0$, in parallel with the pressure loading of the starting volume $V_0$ with the starting pressure $p_0$. In this way, a defined starting state is created, in the case of which no pressure drop is present across the check valves VC1, VC2, respectively VC.

The check valves VC1, VC2, respectively VC, in this method step block the penetration of liquid into container 1.

In the next method step, container 1 filled with gas under the starting pressure $p_0$ is sealed gas tightly by the complete closing of valve V3, and the starting pressure $p_c$ in container 1 measured with the pressure sensor 23.

Then, liquid flow is effected from one or more storage units 7, 9 into container 1. For this, the pressure p provided by the pressure source 11 is fed via the pressure supply lines 13, 15, by a corresponding operating of the valves V1, V2, exclusively to the storage units 7, 9 desired to output the liquid. For effecting the liquid flow into container 1, the pressure p of the pressure source 11 is increased to a pressure p, which lies far enough above the pressure reigning in the interior of container 1, in order to overcome the cracking pressure of the respective check valve VC1, VC2, or VC and the flow resistance of the respective supply line 17, 19 and the supply line 20. In the example of an embodiment according to FIG. 3, supplementally, the frictional resistance of the piston 54, 55 arranged in the storage units 7, 9 and the piston 1 arranged in container 1 must be overcome. In such case, the higher the pressure p, the greater is the liquid flow rate.

The liquid flowing into container 1, which in the case of the embodiment according to FIG. 3 effects a shifting of the piston 51 toward the pneumatic connection 43, compresses the gas in container 1, especially the gas enclosed in the gas space 53, to a gas volume $V_G$ dependent on the total volume V(t) of the liquid, which has flowed in, Thus, gas volume $V_G$ approximately equals the difference between the starting volume $V_0$ and the volume V(t) of the total liquid that has flowed-in up to the respective point in time t. Slight, as a rule, negligibly low, deviations of this difference enter as a function of the compressibility of the respective liquid and the solubility of the gas in the respective liquid. The inflowing liquid effects thereby a rise of gas pressure $p_G(t)$ of the gas in container 1 relative to the starting pressure $p_0$ dependent on the volume V(t) of liquid which has flowed in and on the volume flow rate dV(t)/dt of the inflowing liquid.

According to the invention, the gas pressure $p_G(t)$ of the gas in container 1 is measured as a function of time t, and the total volume V(t) flowed into container 1 to the given time t and/or the volume flow rate dV(t)/dt of liquid flowing into container 1 at the given time t is determined based on the measured gas pressure $p_G(t)$.

Under the assumption that the enclosed gas behaves as an ideal gas, the Boyle-Mariotte law holds, according to which the product of gas pressure $P_G$ and gas volume $V_G$ of the enclosed gas is constant in the case of temperature remaining the same, and therewith here equals the product of starting pressure $p_0$ and starting volume $V_0$. Thus, approximately:

$$p_G V_G = p_G(V_0 - V) = p_0 V_0$$

Based on this relationship, the volume V(t) of liquid that has flowed in up to the given time t is:

$$V(t) = V_0\left(1 - \frac{p_0}{p_G(t)}\right)$$

and the volume flow rate dV(t)/dt of liquid flowing in at the given time t amounts to:

$$\frac{dV(t)}{dt} = -V_0 \frac{d}{dt}\left(\frac{p_0}{p_G(t)}\right)$$

Both variables can be calculated directly based on the gas pressure $p_G(t)$ measured as a function of time t.

For this, the apparatus includes, connected to the pressure sensor 23, an electronic unit 25, which determines the volume flowed in V(t) and/or volume flow rate dV(t)/dt of the inflowing liquid based on the gas pressure $p_G(t)$ measured during each operating cycle with the pressure sensor 23 as a function of time t after the closing of the container 1 filled with gas of starting pressure $p_0$ and starting volume $V_0$.

Since it can, in given cases, be very difficult or complicated to ascertain the starting volume $V_0$ in container 1 exactly and the behavior of the gas, e.g. due to therein contained moisture, can differ slightly from that of an ideal gas, preferably a calibration is first performed.

For this, a relative gas pressure $p_R$ is defined, which equals a quotient of the starting pressure $p_0$ and the gas pressure measured $p_G$. Thus, $$p_R = \frac{p_0}{p_G}$$

In the earlier calibration, based on the above described, defined, starting state with the gas enclosed in the starting volume $V_0$ under the starting pressure $p_0$, a characteristic variable $m_V$ of the apparatus is determined, which gives the slope of the relative gas pressure $p_R$ as a function of the volume V of liquid which has flowed in.

$$m_V = \frac{dp_R}{dV}$$

This change of the relative gas pressure $p_R$ per change of the flowed-in volume V can be determined, for example, by successively filling container 1 with a plurality of known reference volumes, and, based on the resulting measured gas pressure p, plotting the associated relative gas pressure $p_R$ as a function of the liquid volume located, in each case, in container 1. Alternatively, the characteristic variable my can be ascertained by filling container 1 with a constant known reference volume flow rate of liquid, from which the volume V flowed in is derived by integration over time, and the associated relative gas pressure $P_{R, \text{ as measured}}$, plotted as a function of the flowed-in volume V. In both cases, the slope of the plotted characteristic line representing the relative gas pressure $p_R$ as a function of the flowed-in volume V is determined. This slope equals the sought characteristic variable my.

The characteristic variable $m_V$ is a constant, which essentially corresponds to the negative reciprocal value of the starting volume $V_0$, and, at the same time, deviations of the behavior of the gas from that of an ideal gas are taken into consideration.

When such a calibration method can, or should, not be performed, then—in the case of known or through measuring determined, starting volume $V_0$—an approximate value $m_{V'}$ can be used for the subsequently further described method, instead of the characteristic variable $m_V$, where:

$$m'_V = \frac{dp_R}{dV} = \frac{d\left(\frac{p_0}{p_G}\right)}{dV} = \frac{d\left(\frac{V_G - V}{V_0}\right)}{dV} = -\frac{1}{V_0}.$$

Following the calibration, the liquid is drained from container 1 and the defined starting state reproduced.

The subsequent operation of the apparatus occurs preferably in operating cycles following one after the other, in which, first, gas is enclosed in the starting volume $V_0$ under the starting pressure $p_0$, container 1 is then filled with liquid, and, terminally, total liquid flowed into container 1 in the respective operating cycle is removed from container 1.

During the filling procedure, the total volume V(t) flowed in up to the point in time t is determined as a quotient of the relative gas pressure $p_R(t)$ reduced by 1 and the characteristic variable $m_V$. I.e.:

$$V(t) = \frac{p_R(t) - 1}{m_V}$$

During the filling procedure, based on the gas pressure $p_G(t)$ measured as a function of time, a time rate of change $dp_R/dt$ of the relative gas pressure $p_R$ is determined, and the volume flow rate dV(t)/dt to be measured for the inflowing liquid is set equal to a quotient of the time rate of change $dp_R/dt$ of the relative gas pressure $p_R$ and the characteristic variable $m_V$:

$$\frac{dV(t)}{dt} = \frac{\frac{dp_R}{dt}}{m_V}$$

The total volume V(t) flowed into container 1 up to the point in time t can alternatively also be determined by an integration, or summation, over such period of time, of the volume flow rates dV(t)/dt measured in the last named manner.

Preferably, all components, which surround the volume $V_0$, possess approximately the same temperature, which preferably at least approximately equals the temperature of the gas enclosed in the volume $V_0$. Local temperature changes within the volume $V_0$, e.g. by warming of the valve V3, should be prevented as much as possible, since pressure changes can be effected thereby, which lead to a temperature dependent measurement inaccuracy. A pressure change effected by a primarily homogeneous temperature change of the gas enclosed in the volume $V_0$ can be compensated with the assistance of a temperature sensor integrated in the volume $V_0$, e.g. based on the linear temperature dependence of the product of gas pressure $p_G$ and gas volume $V_G$ following from the equation of state for ideal gases.

The filling of container 1 and the measuring of volume V flowed in and/or volume flow rate dV/dt of flowing liquid can now be continued until the gas pressure $p_G$ in container 1, respectively in the gas space 53 (FIG. 3), reaches a predetermined maximum pressure $p_{Gmax}$. This maximum pressure is predetermined by different physical variables, such as, for example, the liquid reception capacity of container 1, the pressure resistance of the supply lines 17, 19, or 20 and of container 1 and the maximum pressure of pressure source 11 or pressure sensor 23. Preferably, the maximum pressure $p_{Gmax}$ is, however, fixed at a pressure of less than 2 bar, e.g. at a pressure of 1 bar, relative to atmospheric pressure. In this way, it is, in the case of the examples of embodiments according to FIGS. 1 and 2, prevented that the gas dissolves in mentionable measure in the liquid, a circumstance which could otherwise lead to a degrading of the accuracy of measurement. To the extent that the application of the apparatus requires, the filling can naturally also be ended before the reaching of the maximum volume $V_{max}$ of liquid in container 1 corresponding to the maximum pressure $p_{Gmax}$.

Following the filling procedure, the liquid located in container 1 is removed from container 1.

For this, container 1 is connected via a drain line 27 equipped with an drain valve VD to a receiving vessel 29, into which the liquid located in container 1 can be removed. Also, here, a modular construction is preferably selected.

Receiving vessel 29 is preferably provided with an air escape opening 31, via which its interior is loaded with ambient pressure.

The drain valve VD is preferably likewise a passive check valve, which has a cracking pressure, which is greater than the difference between the maximal gas pressure $P_{Gmax}$ and the ambient pressure. It is assured therewith that the drain valve VD blocks the drain line 27 during the filling procedure.

For removing the liquid from container 1, liquid supply to container 1 is—as already described above—interrupted. Then, valve V3 is opened and the liquid contained in container 1, or the piston 51 (compare FIG. 3), is supplied via the pressure source 11 with a pressure p, which is sufficient to cause the liquid to flow through the check valve VD and into the drain line 27, i.e. the pressure p must be selected large enough to overcome the cracking pressure of the check valve VD and the line resistance of the drain line 27 and, in given cases, the frictional resistance of the piston 51. This pressure loading effects the opening of the check valve VD and the flowing out of the liquid into the receiving vessel 29.

After the emptying of the container 1, the apparatus is located back in the starting state and the next operating cycle can immediately be executed in the above described manner.

Preferably, the apparatus includes, connected to the pressure sensor 23, a control unit 33, which, following the calibration method based on the measured gas pressure $p_G$, effects a fully automatic operation of the apparatus of the invention by a corresponding operating of the pressure source 11, the valves V1, V2 and the valve V3. Control unit 33 is, for example, an integral component of the electronic unit 25.

The apparatus of the invention can be used, respectively operated, in a variety of ways.

A first application is to operate the apparatus as an automated microsyringe for metering liquids, which, for example, outputs certain desired volumes of individual liquids at predetermined times.

For this, the control unit 33 controls the liquid supply from at least one selected storage unit 7, 9, brought about by the apparatus for effecting the liquid flow, as a function of the measured volume V(t) that has flowed into container 1, and ends the liquid supply through closing of the valves V1, V2, when the measured volume V(t) reaches a certain desired volume. In such case, the control of the valves V1, V2 determines from which storage unit 7, 9, or which storage units 7, 9, container 1 is filled with liquid for reaching the respective desired volume in the respective operating cycle.

Thus, for example, first of all, a desired volume $V_{SA}$ of liquid A can be measured into container 1 from the storage unit 7, that then is output via the drain line 27. Then, a desired volume $V_{SB}$ of the liquid B can be measured from the storage unit 9, that then is output via the drain line 27. Likewise, by parallel filling of container 1 with liquids A and B from the two storage units 7, 9, a desired volume $V_{SAB}$ containing the two liquids A and B can be measured and subsequently output.

Moreover, the apparatus is able to measure and output a desired volume of a liquid, which contains two or more different liquids A, B provided in correspondingly many storage units 7, 9, such that the output volume of liquid contains liquids A and B in a predetermined mixing ratio. For this, container 1 is, within a single operating cycle and via a corresponding control of the apparatus for effecting the liquid flow, successively filled with the certain desired volumes $V_{SA}$, $V_{SB}$ of the individual liquids A, B from the individual storage units A, B, wherein the reaching of the respective desired volumes $V_{SA}$, $V_{SB}$ is monitored based on the measured total volume V(t), which has flowed into container 1, and the volume V measured with the apparatus and already in container 1 at the beginning of the filling with the respective liquids A, B from the respective storage units 7, 9.

In the successive filling of container 1 with the different desired volumes $V_{SA}$, $V_{SB}$ of the individual liquids A, B, preferably the procedure is started with the filling of the liquid A, B, for which the greatest desired volume $V_{SA}$, $V_{SB}$ is required, and the filling then successively continues with the liquid A, B, for which the next smaller desired volume $V_{SA}$, $V_{SB}$ is required. This offers the advantage of a smaller relative measurement error of the particular desired volumes $V_{SA}$, $V_{SB}$, as determined by the accuracy of measurement of the pressure sensor 23.

Through a further development of the apparatus illustrated in FIG. 1 by adding other storage units connected in the same manner and filled with additional liquids, the number of different liquids mixable and dosable in predetermined mixing ratios can be increased to three or more. Alternatively, also here, modular construction can be selected, which enables a preferably likewise automated replacement of individual storage units.

Moreover, container 1 can be used as mixing container, which after its filling with the individual desired volumes $V_{SA}$, $V_{SB}$ etc., is then available as a storage unit, in the sense of the here described storage units 7, 9, in a more complex apparatus.

Another application of the apparatus of the invention is for producing controlled volume flow rates of adjustable size.

In such case, the volume flow rate dV/dt of liquid flowing into container 1 is controlled based on the measured inflowing volume flow dV/dt by a corresponding controlling of the liquid supply into container 1 to a certain desired value. For this, a control system 35 is provided, which is preferably likewise integrated in the electronic unit 25 and connected to the control unit 33. Control system 35 correspondingly controls the liquid supply by controlling the pressure source 11 and the valves V1, V2.

In the case of this application, container 1 is filled via a single feed line FD, through which flows the entire liquid flowing into container 1. The volume flow rate flowing through this feed line FD is, thus, equal to the volume flow rate dV/dt of liquid flowing into container 1 and is correspondingly likewise controlled to the desired volume flow rate.

Feed line FD includes here the supply line 20 connected output side to the apparatus for producing the liquid flow. The total liquid flowing into container 1 also flows through supply line 20.

In the apparatus illustrated in FIG. 1, a corresponding control of the liquid supply permits selectively operating one of the supply lines 17, 19 as part FD17, FD19 of the feed line FD. For this, container 1 is filled exclusively with liquid from one of the storage units 7, 9 by a corresponding operating of the valves V1, V2 in the pressure supply lines 13, 15 leading to the storage units 7, 9, so that the total liquid flowing in container 1 during this time flows through the particular supply line 17, or 19.

Likewise, apparatuses embodied analogously to the illustrated apparatus can naturally be used, in the case of which some selected storage unit opens output side into a feed line, via which, then, in this operating mode, the entire liquid supply into container 1 occurs. Also in the case of this variant, liquid supply from all remaining storage units not connected to the feed line is blocked by the closing of the associated valves in the pertinent pressure supply lines.

The automatic production of certain desired volume flow rates through the feed line FD is especially of great advantage in the case of measuring and/or monitoring chemical and/or physical properties of liquid flowing through the feed line FD as well as in the case of analysis of such liquid.

In this way, by means of the apparatus during the associated filling procedure, a volume flow rate flowing through a measuring- and/or analytical system 37 inserted into the feed line FD can be controlled to a certain desired volume flow optimal for the measuring and/or analysis.

Instead of, or supplementally to, the measuring- and/or analytical unit 37 installed in the feed line FD—formed here by the supply line 20—measuring- and/or analytical systems 37a, 37b can be applied in the supply line 17 to container 1 fed via the storage unit 7 and/or in the supply line 19 to container 1 fed via the storage unit 9.

While container 1 is being filled exclusively with liquid A from the storage unit 7, the total volume flow rate dV/dt of liquid flowing into container 1 flows through the supply line 17, which becomes thereby part FD17 of the feed line FD. Correspondingly, the volume flow rate through the measuring- and/or analytical system 37a can, in this case, be controlled to a certain desired volume flow rate based on the measured volume flow dV/dt.

While container 1 is being filled exclusively with liquid B from the storage unit 9, the total volume flow rate dV/dt of liquid flowing into container 1 flows through the supply line 19, which becomes thereby part FD19 of the feed line FD. Correspondingly, the volume flow rate through the measuring- and/or analytical system 37b can, in this case, be controlled to a certain desired volume flow rate based on the measured volume flow dV/dt.

If container 1 is—as above mentioned—used as a mixing container, which, after its filling with individual desired volume $V_{SA}$, $V_{SB}$ etc., is applied as storage unit, in the sense of the here described storage units 7, 9, in a more complex apparatus, then also the drain line 27 can be operated as a feed line in the above described sense, and the volume flow rate controlled through a measuring- and/or analytical system (not shown) applied in the drain line 27. Moreover, it is naturally basically always an option to use in the drain line 27 such measuring- and/or analytical systems, which are also functionally able without a control of the volume flow flowing through the drain line 27.

The apparatus according to the invention is therewith extremely versatilely applicable.

The simplest application is the pure measuring of the flowed-in volume V(t) and/or of the volume flow rate dV(t)/dt flowing into container 1.

Moreover, as above described, certain desired volumes $V_{SA}$, $V_{SB}$ can be measured and output individually or metered in predetermined mixing ratios. This is especially required in chemical and biochemical analysis in homogeneous liquid phase.

Moreover, the apparatus enables setting desired volume flow rates through the feed line FD, or FD17 or FD19. This property is especially required in surface bonded, chemical and biochemical analysis, e.g. for operating an automated immunoassay.

In such case, an option is directly to use the same apparatus in an operating cycle, or in operating cycles following one after the other, both for producing a desired volume flow rate through one of the measuring- and/or analytical systems 37, 37a, 37b as well as also for highly accurate metering of certain desired volumes of individual liquids or a plurality of liquids to be mixed in a predetermined mixing ratio of the individual liquids A, B in the storage units 7, 9.

Thus, the container 1 can, for example, first of all, be filled with a certain desired volume $V_{SA\ of}$ liquid A while maintaining a certain desired volume flow rate through the measuring- and/or analytical system 37a applied in the supply line 17, and then be filled with a certain desired volume $V_{SB}$ of liquid B while maintaining a certain desired volume flow rate through the measuring- and/or analytical system 37b applied in the supply line 19, and terminally, the liquid in container 1 composed of the liquids A and B in the mixing ratio predetermined by the two desired volumes $V_{SA}$ and $V_{SA}$ is output.

The apparatuses of the invention offer the advantage that they permit dosing and volume flow control in almost any manner one after the other and/or in combination with one another. With the apparatus of the invention, thus, extremely complex procedures and methods can be executed fully automatically.

In such case, modular construction offers the advantage that, via preferably automated replacement of storage units 7, 9 and/or receiving vessels 25, a high measure of flexibility is provided and practically as many different liquids A, B as desired can be processed.

Ideally, in such case, all liquid containing and all liquid conveying components, thus the storage units 7, 9, container 1, the receiving vessel 29, and the supply lines 17, 19, 20 are embodied as modules, which are joined to form an assembly.

Likewise, all remaining mechanical, pneumatic and electronic components, thus the pressure source 11, the electronic unit 25, the pressure sensor 23 and the pressure supply lines 13, 15, 21, 22 and the therein contained valves V1, V2, V3, are preferably combined into one unit. This unit can then be applied in connection with different assemblies, wherein the connection of the unit to the particular assembly occurs in simple manner via pneumatic connections 39, 41, equipped advantageously with liquid impermeable, gas permeable membranes or filters. A pneumatic interface is also described in the German patent application of the assignee, Endress+Hauser, with the application No. 10 2010 00 33 04.9 filed 25 Mar. 2010.

The invention claimed is:

1. A method for measuring volume flow rate of liquid flowing into a container and/or volume of liquid, which has flowed into the container, which method comprises the steps of:

enclosing a gas under a starting pressure in a predetermined starting volume in the container before liquid flows in;

then allowing liquid to flow into the container to compress the enclosed gas to a gas volume dependent on the volume of liquid which has flowed into the container and to effect a rise of gas pressure of the gas in the container relative to the starting pressure dependent on the volume of liquid which has flowed in and on the volume flow rate of the inflowing liquid;

measuring gas pressure in the container as a function of time; and determining, based on measured gas pressure, the volume of liquid which has flowed in up to a given time and/or the volume flow rate of inflowing liquid at the given time.

2. The method as claimed in claim 1, further comprising the step of:
determining the volume of liquid which has flowed in up to the given time based on the gas pressure measured at the given time.

3. The method as claimed in claim 1, further comprising the steps of:
determining a time rate of change of the measured gas pressure; and
determining the volume flow rate of liquid flowing at the given time into the container based on the time rate of change of gas pressure measured at the given time.

4. The method as claimed in claim 1, wherein:
a relative gas pressure is defined, which equals a quotient of the starting pressure and the gas pressure;
a characteristic variable is determined, which gives the slope of the relative gas pressure as a function of the volume of liquid which has flowed in;
during the flowing of liquid into the container, the relative gas pressure is determined as a function of time based on the gas pressure measured as a function of time; and
the volume and/or volume flow rate are determined based on the relative gas pressure.

5. The method as claimed in claim 4, wherein:
the characteristic variable is determined in a previous calibration method.

6. The method as claimed in claim 4, wherein:
the volume which has flowed in up to the point in time is determined as a quotient of the relative gas pressure at the given time reduced by 1 and the characteristic variable; and/or
a time rate of change of the relative gas pressure is determined; and
the volume flow rate of liquid flowing at the given time is determined as a quotient of the time rate of change of the relative gas pressure and the characteristic variable.

7. An apparatus for performing a method comprising the steps of:
enclosing a gas under a starting pressure in a predetermined starting volume in the container before liquid flows in; then allowing liquid to flow into the container to compress the enclosed gas to a gas volume dependent on the volume of liquid which has flowed into the container and to effect a rise of gas pressure of the gas in the container relative to the starting pressure dependent on the volume of liquid which has flowed in and on the volume flow rate of the inflowing liquid; measuring gas pressure in the container as a function of time; and determining, based on measured gas pressure, the volume of liquid which has flowed in up to a given time and/or the volume flow rate of inflowing liquid at the given time; the apparatus comprises:
an apparatus connected to the container and serving to enclose gas under a starting pressure in a predetermined starting volume in the interior of the container before liquid flows in;
a pressure sensor for measuring gas pressure in the container;
a liquid supply system connected to a filling opening of the container opening into the interior of the container and serving to supply liquid to the container; and
an electronic unit, which is operative to determine, based on the gas pressure measured with said pressure sensor after the closing of the container filled with gas under the starting pressure with the starting volume, the volume of the liquid which has flowed in and/or the volume flow rate of the inflowing liquid.

8. The apparatus as claimed in claim 7, wherein:
the container includes a piston movable in the interior of the container and liquid- and gas tightly contacting a container wall enclosing the interior for dividing the container into a liquid space, into which the filling opening opens, and a gas space, which is in communication with the apparatus serving to enclose gas in a predetermined starting volume in the interior of the container under a starting pressure before liquid flows in, as well as being in communication with said pressure sensor.

9. The apparatus as claimed in claim 7, further comprising:
a control unit, which controls the liquid supply effected by the liquid supply system as a function of the flowed-in volume measured in the container or the measured volume flow rate of liquid inflowing into the container.

10. The apparatus as claimed in claim 9, wherein:
said control unit ends the liquid supply, when the measured volume reaches a certain desired volume.

11. The apparatus as claimed in claim 7, wherein:
the liquid supply system includes at least one storage unit filled with liquid and an apparatus for effecting liquid flow from said at least one storage unit into the container;
said at least one storage unit has a chamber, in which liquid is accommodated, and in which is arranged a movable piston liquid- and gas tightly contacting an inner wall enclosing said chamber; and
said piston divides the at least one storage unit into a liquid space connected with the container via at least one liquid line and a gas space connected with the apparatus for effecting liquid flow from the storage unit into the container.

12. A method for operating an apparatus connected to a container and serving to enclose gas under a starting pressure in a predetermined starting volume in the interior of the container before liquid flows in; a pressure sensor for measuring gas pressure in the container; a liquid supply system connected to a filling opening of the container opening into the interior of the container and serving to supply liquid to the container; and an electronic unit, wherein: a liquid supply system of the apparatus includes at least two storage unit filled with liquid and an apparatus for effecting liquid flow from said storage units into the container, the method comprising the steps of:
enclosing the gas in the predetermined starting volume under the starting pressure; and
filling the container via the apparatus for effecting the liquid flow successively with certain desired volumes of liquids from two or more different storage units, wherein:
the reaching of the respective desired volumes of the individual liquids is monitored based on the measured total volume, which has flowed into the container, and the volume already located in the container at the beginning of the respective filling procedure with the respective liquid from the respective storage unit and measured with the apparatus.

13. The method according to claim 12, wherein:
in the successive filling of the container with the different desired volumes of the individual liquids, the filling starts with the liquid, of which the greatest desired volume is required, and the filling then successively continues, in each case, with the liquid, of which the next smaller desired volume is required.

14. The apparatus as claimed in claim 7, further comprising:
a control system, wherein:
the liquid supply system transports the liquid through a feed line into the container;
volume flow rate of the liquid through the feed line equals volume flow rate of liquid flowing into the container; and
said control system is provided, which controls the liquid supply effected by the liquid supply system based on the measured volume flow rate into the container in such a manner that volume flow rate through the feed line and volume flow rate into the container correspond to a certain desired volume flow rate.

15. The apparatus as claimed in claim 14, further comprising:
a measuring- or analytical system is inserted into the feed line, wherein:
volume flow rate of the liquid through said measuring- or analytical system equals volume flow rate through the feed line and equals volume flow rate of liquid flowing into the container; and
said control system controls volume flow rate through said measuring- or analytical system to a certain desired volume flow rate based on the measured volume flow into the container.

16. The apparatus as claimed in claim 7, wherein:
the liquid supply system includes at least one storage unit filled with liquid and an apparatus for effecting liquid flow from at least one of the storage units into the container, said apparatus for effecting the liquid flow includes a controllable pneumatic pressure source, which is connected to each storage unit via a pressure supply line equipped with a controllable valve, especially a 3/2 valve; and
liquid flow is effected by pressure loading of liquid in the storage units with pressure provided by said controllable pneumatic pressure source, especially with pressure produced via movable pistons arranged in the storage units.

17. The apparatus as claimed in claim 16, wherein:
said controllable pneumatic pressure source is connected to the container via a pressure supply line closable with a controllable valve, especially a 3/2 valve.

18. The apparatus as claimed in claim 16, wherein:
the liquid supply system is connected to the container via at least one supply line equipped with a valve, especially a check valve.

19. A method for operating an apparatus connected to a container and serving to enclose gas under a starting pressure in a predetermined starting volume in the interior of the container before liquid flows in; a pressure sensor for measuring gas pressure in the container; a liquid supply system connected to a filling opening of the container opening into the interior of the container and serving to supply liquid to the container; and an electronic unit, wherein: the liquid supply system includes at least one storage unit filled with liquid and an apparatus for effecting liquid flow from at least one of the storage units into the container, said apparatus for effecting the liquid flow includes a controllable pneumatic pressure source, which is connected to each storage unit via a pressure supply line equipped with a controllable valve, especially a 3/2 valve; and liquid flow is effected by pressure loading of liquid in the storage units with pressure provided by said controllable pneumatic pressure source, especially with pressure produced via movable pistons arranged in the storage units, wherein operating cycles are executed, in which, in each case:
the container and the liquid in the storage units are earlier supplied with the starting pressure via the 3/2 valves;
the valve in the pressure supply line leading from the pressure source to the container is closed;
liquid flow into the container is effected by pressure loading liquid in at least one of the storage units with a pressure provided by the pressure source; and,
terminally, total liquid that flowed into the container in the respective operating cycle is removed from the container, especially by pressure loading.

20. The apparatus as claimed in claim 17, wherein:
the container is connected via a drain line equipped with a valve, especially a check valve, to a receiving vessel, which is loaded via an air escape opening with ambient pressure and into which liquid located in container can be removed.

21. A method for operating an apparatus, wherein a liquid supply system includes at least one storage unit filled with liquid and an apparatus for effecting liquid flow from at least one of the storage units into the container, said apparatus for effecting the liquid flow includes a controllable pneumatic pressure source, which is connected to each storage unit via a pressure supply line equipped with a controllable valve, especially a 3/2 valve; and liquid flow is effected by pressure loading of liquid in the storage units, with pressure provided by said controllable pneumatic pressure source, especially with pressure produced via movable pistons arranged in the storage units, said controllable pneumatic pressure source is connected to the container via a pressure supply line closable with a controllable valve, especially a 3/2 valve, the container is connected via a drain line equipped with a valve, especially a check valve, to a receiving vessel, which is loaded via an air escape opening with ambient pressure and into which liquid located in container can be removed, wherein liquid is removed from the container at the end of a fill cycle, by:
interrupting liquid supply into the container; and
loading liquid contained in the container with a pressure via the pressure source, whereupon the liquid flows through the check valve and out via the drain line.

22. The method for operating an apparatus according to claim 7, wherein:
the operating cycles are executed, which method comprises, in each cycle the steps of:
enclosing gas in the predetermined starting volume under the starting pressure,
effecting liquid flow into the container and measuring volume flow rate of liquid inflow and/or volume flowed in,
interrupting liquid supply into the container, before gas pressure in the container exceeds a predetermined maximum pressure; and,
terminally, removing from the container total liquid, which flowed into the container in the respective fill cycle.

* * * * *